Nov. 16, 1965   R. A. MUNSE   3,217,582
REUSABLE SCREW RECEIVING PLASTIC FASTENER
Filed Nov. 6, 1963   3 Sheets-Sheet 1

INVENTOR.
ROBERT A. MUNSE
BY
Malcolm W. Fraser
ATTORNEY

*INVENTOR.*
ROBERT A. MUNSE
BY
ATTORNEY

United States Patent Office 3,217,582
Patented Nov. 16, 1965

3,217,582
REUSABLE SCREW RECEIVING
PLASTIC FASTENER
Robert A. Munse, Perrysburg, Ohio, assignor, by mesne assignments, to The Bishop and Babcock Corporation, Toledo, Ohio, a corporation of Ohio
Filed Nov. 6, 1963, Ser. No. 321,790
5 Claims. (Cl. 85—32)

The present invention relates to a fastener for a screw-threaded shank, but more particularly to a reusable plastic fastening means for quick and convenient engagement by a screw.

In many industries, it has been found highly desirable from a structural standpoint, as well as from an economical standpoint, to form fasteners for screw-threaded studs from plastic materials. However, due to the cost considerations of dies and other fabricating machinery, attempts at forming internal screw receiving threads in plastic fasteners have not proved entirely satisfactory.

It is an object of the invention to produce a reusable plastic fastening device for reception of screw-threaded members which is simple in construction and arrangement and can be economically manufactured in quantity production.

Another object of the invention is to produce a reusable plastic fastener for the reception of screw-threaded studs in which it unnecessary to mold or otherwise form internal threads prior to the final assembly with a screw-threaded stud.

A further object of the invention is to produce a reusable plastic fastener for rapid assembly and screw-threaded engagement with a screw-threaded member.

These and other objects of the invention may be achieved by a preferred embodiment of the invention which consists of a reusable plastic fastener for a screw-threaded stud comprising a body portion having a socket extending inwardly from a surface of the body portion for freely receiving the terminal end of a screw-threaded member; a laterally shiftable pin of plastic material having a slot formed therein and opening at one end thereof, the slot having a spacing between the side walls thereof of slightly less dimension than the diameter of the screw-threaded stud for reception in the socket; and slide means integral with the one surface of the body portion for slidably receiving the laterally shiftable pin, whereby when the terminal end of the screw-threaded stud is inserted in the socket of the body portion and the pin is shifted laterally in the slide means, the side walls of the slot in the pin are caused to snugly engage a peripheral portion of the screw-threaded stud forming cooperating thread impressions on the side wall of the slot.

Figure 1:
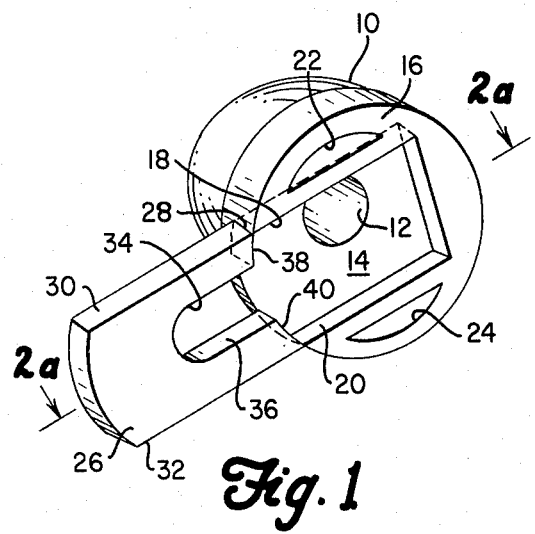
Figure 2A:
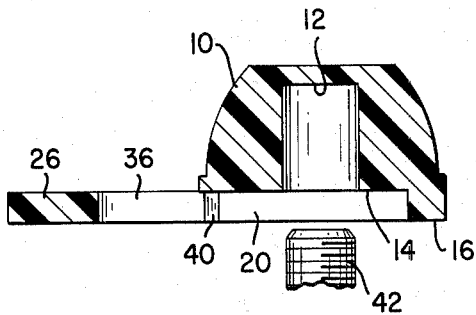
Figure 2B:
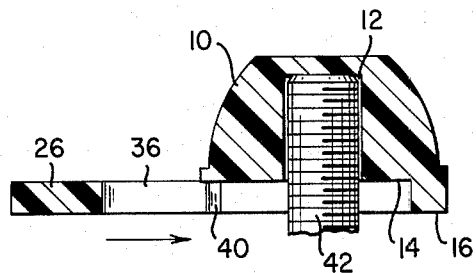

The above objects and advantages of the invention will be fully understood from the following detailed description of preferred embodiments of the invention in connection with the attached drawings, in which:

FIGURE 1 is a perspective view of a preferred embodiment of the plastic fastener incorporating the features of the invention, FIGURE 2a is a sectional view of the invention taken along line 2—2 of FIGURE 1, FIGURE 2b is a sectional view of the fastener taken along line 2b—2b of FIGURE 1 showing the screw-threaded stud after being inserted into its socket in the main body of the fastener.

Figure 3:
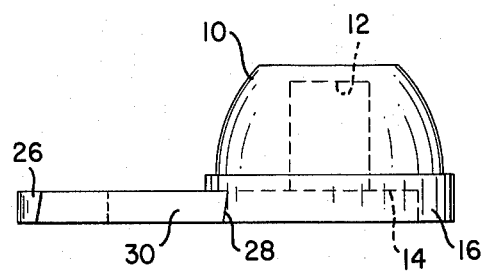
Figure 2C:
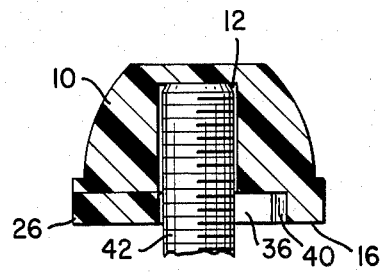
Figure 4:
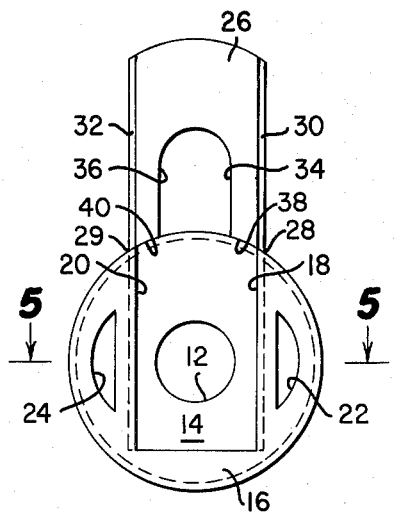
Figure 5:
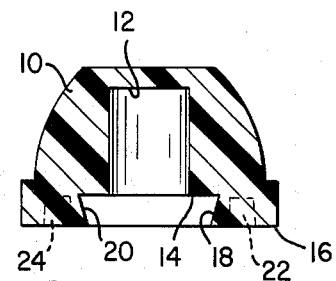
Figure 6:
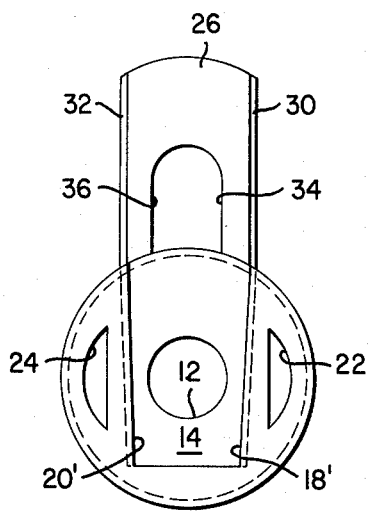
Figure 7:
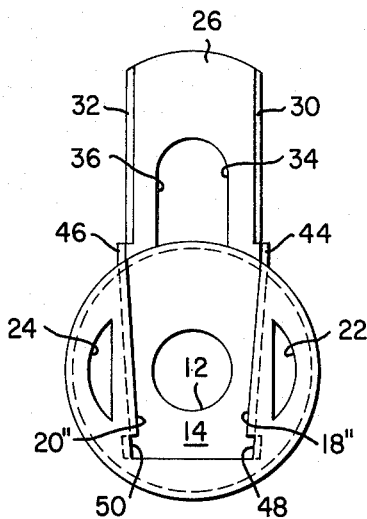
Figure 8:
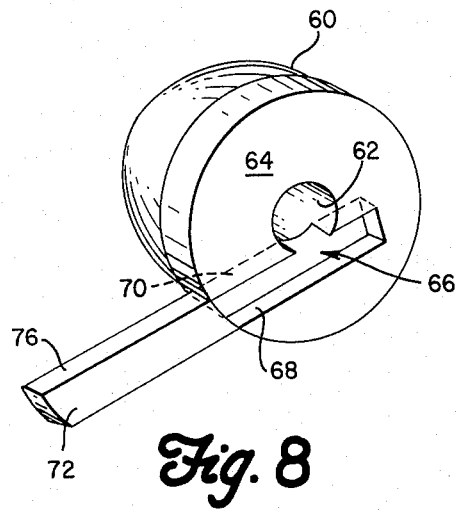
Figure 9:
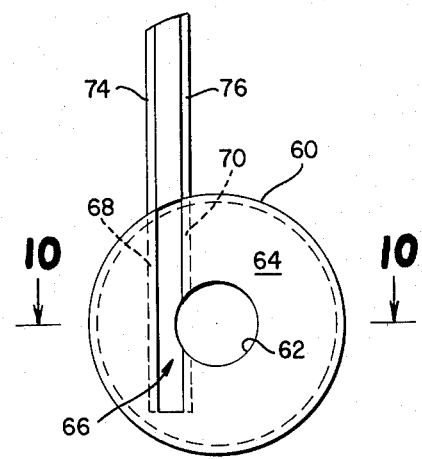
Figure 10:
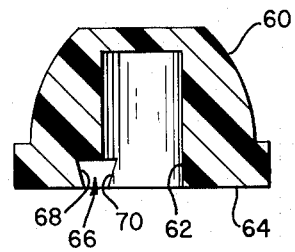

FIGURE 2c is a sectional view of the fastener similar to that shown in FIGURES 2a and 2b showing the pin after being shifted into engagement with an associated screw-threaded stud, FIGURE 3 is an elevational view of the fastener illustrated in FIGURE 1, FIGURE 4 is a bottom plan view of the fastener illustrated in FIGURES 1 to 3, inclusive, FIGURE 5 is a sectional view of the fastener taken along line 5—5 of FIGURE 4, FIGURE 6 is a bottom plan view of an alternate of the fastener illustrated in FIGURES 1 to 5, inclusive, FIGURE 7 is another modification of the fastener shown in the other figures hereinbefore mentioned, FIGURE 8 is a perspective view of a further embodiment of the plastic fastener incorporating the features of the invention, FIGURE 9 is a bottom plan view of the fastener illustrated in FIGURE 8, and FIGURE 10 is a sectional view of the fastener taken along line 10—10 of FIGURE 9.

Referring to FIGURES 1 though 5, there is shown the preferred embodiment of the fastener device of the invention. The fastener device consists of a main body portion 10 having a generally centrally located cavity or socket 12 extending inwardly from a substantially planar surface 14.

A portion 16 integral with the body portion 10 of the fastener depends downwardly therefrom and defines an inner channel which extends generally perpendicularly to the axis of the socket or cavity 12. The sides of the channel are defined by a pair of spaced inclined walls 18 and 20 which extend from one side of the fastener toward the opposite side but do not extend the entire distance across the bottom thereof, thereby rendering the channel open at one end and closed at the other.

Adjacent each of the walls 18 and 20, there is preferably formed in the downwardly extending portion 16 cavities 22 and 24, respectively. The cavities 22 and 24 impart flexibility to their walls 18 and 20. The necessity for the cavities 22 and 24 is determined primarily by the property of the plastic material which is selected for molding the fastener.

A pin-like element 26 having outer walls 30 and 32 and an internal slot defined by spaced side walls 34 and 36 is molded integral with the main body portion 10. It will be noted that the pin-like element 26 is joined to the main body portion 10 at juncture lines 28 and 29 adjacent the curved leading end walls of the slide 38 and 40, respectively. The juncture lines 28 and 29 are preferably formed to provide a relatively thin or frangible layer of plastic material enabling the pin-like element 26 to be separated from the main body portion 10 upon the application of pressure between the element 26 and the main body of the fastener 10. Preferably, the pressure is applied to the element 26 such that it will be caused to slide within the channel or slideway formed by the spaced walls 18 and 20. When the element 26 is caused to slide within the channel, the side walls 30 and 32 thereof are in intimate sliding contact with the walls 18 and 20, respectively. As will be clearly apparent from an examination of FIGURES 4 and 5, the inclination of the side walls 30 and 32 is substantially identical with the angle of inclination of the side walls 18 and 20 of the channel of the main body portion 10. Manifestly, by inclining the walls in such a fashion, the element 26 is prevented from dropping out of the slideway.

In FIGURES 2a, 2b and 2c, there is shown the typical fashion by which the plastic fastener of the invention as applied to an associated screw-threaded stud. Initially, the screw-threaded stud 42 is inserted into the socket 12 formed within the main body portion of the plastic fastener 10. As a general rule the screw-threaded stud member 42 is inserted so that the free terminal end thereof engages the end wall of the socket 12. Next, the pin-like element 26 is forced in the direction of the arrow in FIGURE 2b so that the external threads of the screw-threaded stud 42 are engaged by the spaced walls 34 and 36 of the slot formed in the slide member 26. Since the plastic material of the fastener is relatively soft as compared with the metallic screw-threaded stud member 42, threaded impressions are formed in the walls 34 and 36 of the slide member 26 which correspond to the threads of the screw-threaded stud. It should be noted that the spacing between the side walls 34 and 36 is slightly less than the outside diameter of the screw-threaded stud member 42, thereby assuring that the thread impressions will be formed thereon. Finally, the element 26 is driven laterally to its position of rest whereupon the end faces 38 and 40 abut against the inner end of the channel as shown in FIGURE 2c wherein the plastic fastener is illustrated in its final assembled form on the associated screw-threaded member 42.

It will be appreciated that the fastener, if desired, may be removed from the screw-threaded stud and be reused. To remove the plastic fastener from the screw-threaded stud, the fastener is turned relative to the stud in such a manner that the fastener may be "backed off." To facilitate the backing off of the plastic fastener, the outer peripheral portion of the downwardly depending portion 16 may be formed in the shape of a hexagon, for example, to enable the use of a wrench for removing the fastener.

Referring now to FIGURE 6, there is disclosed an alternate form of the plastic fastener illustrated in FIGURES 1 to 5. The fastener illustrated in FIGURE 6 is similar to the fastener described hereinbefore with the exception of the relative disposition of the side walls which form the channel for receiving the pin-like element 26. The walls 18' and 20' are so disposed that the outer ends thereof are spaced apart an amount sufficient to readily receive the pin-like element 26. The opposite or inner ends of the walls 18' and 20' are spaced closer together to cause the leading ends of the slide member 26 to be cammed or to be urged together as the element 26 is driven or forced inwardly of the fastener.

The embodiment of FIGURE 6 insures that the leading ends of the slide member 26 are urged together so that the inner surfaces of the walls 34 and 36 firmly engage the exterior threaded portion of an associated screw-threaded stud. This feature of the fastener 6 results in a tighter engagement between the fastener and the screw-threaded stud. It will be understood that the structure requires more force to drive the walls 34 and 36 of the element 26 across the associated threaded stud, thereby assuring a deeper thread impression in the walls of the slot of the slide 26.

The embodiment shown in FIGURE 7 is similar to that shown in FIGURE 6 with the exception that the inner ends of the slide 26 are provided with outwardly extending fingers 44 and 46 which are adapted to engage in cooperating notches 48 and 50, respectively, in the inner ends of the inwardly tapering walls 18" and 20", respectively, until the element is in its innermost position thereupon the fingers 44 and 46 will spring upwardly to be received in their respective notch portions 48 and 50, respectively. This modification of the invention prevents any outward or retrograde movement of the pin-element 26 after it has been driven into position of use.

Referring to FIGURES 8 through 10, there is illustrated a modification of the invention wherein the pin-like element is a single arm type. The fastener illustrated in FIGURES 8 to 10 consists of a main body portion 60 having a generally centrally located cavity or socket 62 extending inwardly from a substantially planar surface 64. A slot 66 is formed to extend inwardly of the surface 64 and extends adjacent the socket 62. The slot 66 is defined by a pair of spaced parallel extending inclined walls 68 and 70 which extend from one side of the fastener toward the opposite side but do not extend the entire distance across the bottom thereof, thereby rendering the slot open at one end and closed at the other.

A pin element 72 having side walls 74 and 76 which are inclined in approximately the same angular relation as the side walls 68 and 70 of the slot, respectively, is joined to the main body portion at juncture lines which typically provide a relatively thin or frangible layer of plastic material enabling the pin 72 to be separated from the main body portion upon the application of a small amount of pressure.

In operation, a threaded shank is inserted in the socket or cavity 62 and then the pin 72 is driven inwardly from the position illustrated in FIGURES 8 and 9 to a position fully received within the slot 66. Thread impressions are formed on the side wall 76 of the pin 72 which are effective to retain the threaded shank within the cavity and interconnect the fastener 60 and the associated threaded shank. The threaded shank may be removed from the fastener 60 by suitably applying an unscrewing turning movement thereto, thereby permitting the fastener 60 to be reused.

Although many different types of plastic material may be used for molding the plastic fastener hereinabove described and illustrated, the preferred plastic material is of polypropylene which has the desired characteristics of weight, toughness and rigidity. It will be appreciated from the foregoing description that the invention has produced a plastic fastener of a reusable type which may be rapidly assembled for engagement with a screw-threaded stud.

According to the patent statutes, I have explained the principles and mode of operation of my invention and have illustrated and described what I now consider to represent the best embodiments. However, I desire to have it understood that, within the scope of the appended claims, the invention may be practiced otherwise than as specifically illustrated and described.

What I claim is:

1. A reusable non-metallic plastic fastener for a screw-threaded stud comprising a body portion having a cylindrical smooth-surfaced socket extending axially inwardly from a surface thereof; a screw-threaded stud having a terminal end extending into and being of less diameter than said socket; a pin of non-metallic plastic material shiftable at right angles to said socket, said pin having a slot formed therein and opening at the inner end thereof, the slot having a spacing between the side walls thereof of slightly less dimension than the diameter of said socket and the other diameter of said screw-threaded stud; and guide means integral with said one surface of said body portion for slidably receiving said pin, said guide means including means to prevent movement of said pin in a direction normal to said slot, whereby when the terminal end of said screw-threaded stud is inserted into said socket and said pin is shifted transversely into said guide means, the side walls of the slot in said pin are caused snugly to engage a peripheral portion of said stud forming cooperating thread impressions on the side walls of said slot.

2. A reusable plastic fastener for a screw-threaded stud as defined in claim 1 wherein said pin is initially adhered to said body portion by a thin readily severable line of non-metallic plastic material.

3. A reusable plastic fastener for a screw-threaded stud as defined in claim 1 in which said guide means is inwardly tapered in the direction in which the pin is to be moved.

4. A reusable plastic fastener for a screw-threaded stud as defined in claim 1 wherein the inner end of said pin at the open end of the slot therein is provided with oppositely extending feet, and said guide means is provided with notches to receive said feet positively to retain said pin in said guide means.

5. A reusable non-metallic plastic fastener for a screw-threaded stud comprising a body portion having a cylindrical smooth-surfaced socket extending axially inwardly from a surface thereof; a screw-threaded stud having a terminal end extending into and being of less diameter than said socket; a pin of non-metallic plastic material shiftable at right angles to said socket, said pin having one side wall thereof positioned inwardly of the adjacent side wall of the socket of said body portion and being disposed so that said side wall traverses said socket at a position less than the diameter of said socket and the outer diameter of said screw-threaded stud, and guide means integral with said one surface of said body portion for slidably receiving said pin, said guide means including means to prevent movement of said pin in a direction normal to said slot, whereby when the terminal end of said screw-threaded stud is inserted into said socket and said pin is shifted transversely into said guide means, said side wall of said pin is caused snugly to engage a peripheral portion of said stud forming cooperating thread impressions on the side wall of said pin.

References Cited by the Examiner

UNITED STATES PATENTS

| | | | |
|---|---|---|---|
| 589,013 | 8/1897 | Millen | 85—8.6 |
| 840,249 | 1/1907 | Patton | 151—26 |
| 1,022,201 | 4/1912 | Moore | 151—26 |
| 1,180,672 | 4/1916 | Sedinger | 151—26 |
| 1,500,531 | 7/1924 | Schweinert et al. | 85—33 |
| 2,736,462 | 2/1956 | Manhartsberger | 151—26 |
| 2,894,426 | 7/1959 | Rapata | 85—36 |
| 2,948,317 | 8/1960 | Munro | 85—8.8 |
| 3,144,909 | 8/1964 | Hart et al. | 85—8.8 |

CARL W. TOMLIN, *Primary Examiner.*

EDWARD C. ALLEN, *Examiner.*